United States Patent
Amirat et al.

(10) Patent No.: US 9,841,188 B2
(45) Date of Patent: Dec. 12, 2017

(54) POWER SUPPLY FOR HOT OXYGEN BURNER

(75) Inventors: Mohand Amirat, Gas (FR); Johan Behen, Jumet (BE); Gabriel Constantin, Buc (FR); Olivier Douxchamps, Jumet (BE); Benoit Grand, Gas (FR); Remi Tsiava, Saint Germain-les Corbeil (FR); Fabrice Wagemans, Jumet (BE)

(73) Assignees: AGC GLASS EUROPE, Brussels (BE); L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 2113 days.

(21) Appl. No.: 12/999,918

(22) PCT Filed: Jun. 30, 2009

(86) PCT No.: PCT/EP2009/058139
§ 371 (c)(1),
(2), (4) Date: Dec. 17, 2010

(87) PCT Pub. No.: WO2010/000709
PCT Pub. Date: Jan. 7, 2010

(65) Prior Publication Data
US 2011/0104625 A1    May 5, 2011

(30) Foreign Application Priority Data
Jul. 2, 2008 (EP) .................................... 08104609

(51) Int. Cl.
*F23B 90/00* (2011.01)
*F23D 14/32* (2006.01)
(Continued)

(52) U.S. Cl.
CPC ............ *F23D 14/32* (2013.01); *C03B 5/2353* (2013.01); *F23C 6/045* (2013.01); *F23D 14/22* (2013.01);
(Continued)

(58) Field of Classification Search
USPC .......................................... 431/190
See application file for complete search history.

(56) References Cited

U.S. PATENT DOCUMENTS 5,807,418 A * 9/1998 Chamberland et al. ..... 65/134.4
5,984,667 A * 11/1999 Philippe et al. ............. 431/175
(Continued)

FOREIGN PATENT DOCUMENTS

| DE | 10 2005 005 832 | 8/2006 |
|---|---|---|
| WO | 2004 094902 | 11/2004 |
| WO | 2007 074278 | 7/2007 |

OTHER PUBLICATIONS

International Search Report dated Oct. 16, 2009 in PCT/EP09/058139 filed Jun. 30, 2009.

*Primary Examiner* — Jason Lau
(74) *Attorney, Agent, or Firm* — Oblon, McClelland, Maier & Neustadt, L.L.P.

(57) ABSTRACT

The present invention relates to the supplying power to burners for oxy-fuel combustion glass melting furnaces, including a fuel injecting means and a hot oxygen power supplying means, the dispensing of oxygen being carried out so as to develop a staged combustion, a fraction of the oxygen being concurrently injected into the fuel, said oxygen being supplied essentially without heating prior to the supplying thereof into the fuel injecting means.

14 Claims, 4 Drawing Sheets

(51) Int. Cl.
  *C03B 5/235*  (2006.01)
  *F23C 6/04*  (2006.01)
  *F23D 14/22*  (2006.01)
  *F23L 7/00*  (2006.01)
  *F23L 15/04*  (2006.01)

(52) U.S. Cl.
  CPC ............... *F23L 7/007* (2013.01); *F23L 15/04* (2013.01); *Y02E 20/344* (2013.01); *Y02E 20/348* (2013.01); *Y02P 40/55* (2015.11)

(56) References Cited

U.S. PATENT DOCUMENTS

| | | | |
|---|---|---|---|
| 6,699,029 B2 * | 3/2004 | Kobayashi et al. | 431/10 |
| 6,783,357 B2 * | 8/2004 | Joshi et al. | 431/161 |
| 2003/0157450 A1 * | 8/2003 | Joshi et al. | 431/161 |
| 2003/0175637 A1 * | 9/2003 | Stephens | 431/9 |
| 2007/0172781 A1 * | 7/2007 | Tsiava et al. | 431/10 |
| 2007/0281254 A1 * | 12/2007 | Leroux et al. | 431/6 |
| 2007/0287107 A1 * | 12/2007 | Tsiava et al. | 431/8 |
| 2008/0098736 A1 * | 5/2008 | Lee et al. | 60/734 |
| 2009/0239182 A1 * | 9/2009 | Tsiava et al. | 431/12 |

* cited by examiner

POWER SUPPLY FOR HOT OXYGEN BURNER

CROSS REFERENCE TO RELATED APPLICATIONS

The present application is a 35 U.S.C. §371 national stage patent application of International patent application PCT/EP2009/058139, filed on Jun. 30, 2009, published as WO/2010/000709 on Jan. 7, 2010, the text of which is incorporated by reference, and claims the benefit of the filing date of European application no. 08104609.6, filed on Jul. 2, 2008, the text of which is also incorporated by reference.

FIELD OF THE INVENTION

The present invention relates to the use of burners operating with oxygen brought to an elevated temperature and fuels in gaseous or liquid state. Burners of this type are intended in particular, but not exclusively, for use in glass melting furnaces. The mode of combustion using oxygen or a gas rich in oxygen (at least 85% oxygen) is referred to as "oxy-combustion".

BACKGROUND OF THE INVENTION

Compared to combustion using air, oxy-combustion allows an energy saving at least on the basis that the energy of the combustion gases is not partially absorbed by the nitrogen in the air. In traditional furnaces, even if part of the energy entrained with nitrogen is recovered, the fumes containing nitrogen that are ultimately discharged still entrain a significant proportion thereof.

Reducing the energy consumption per production unit in question has the additional advantage of limiting carbon dioxide emissions and therefore enabling regulatory requirements in this field to be met.

The presence of nitrogen is, moreover, a source of the formation of so-called NOx oxides, the emission of which is forbidden in practice because of the damage associated with the presence of these compounds in the atmosphere.

In practice, users endeavour to operate furnaces that work with air in conditions that result in the most limited amount of emissions possible. In the case of glassmaking furnaces, these practices are not sufficient to meet the very strict standards in force, and it is necessary to conduct a costly decontamination of fumes using catalysts.

In spite of the advantages outlined above, the use of oxy-combustion, in particular in large glassmaking furnaces, is yet to be developed. There are various reasons for this. One drawback lies in the cost of oxygen. This is compensated, in principle, by economies carried out elsewhere. Nevertheless, it is to be taken into consideration in that there are additional investments in specific equipment for the use of oxygen.

The economic evaluation of using oxy-combustion is only positive when the conditions of use are optimised. With respect to energy efficiency, this requires the use of oxygen at elevated temperature, i.e. a temperature of several hundreds of degrees.

Secondly, it is also expedient to preheat the fuel and also the batch materials to some extent.

The preheating of oxygen and its use are delicate operations. The difficulties that arise result in particular from the extremely corrosive nature of hot oxygen for materials used in contact with it, in particular metal alloys.

While the inventors in the unpublished prior application (European Patent Application No. 07 107 942 filed on 10 May 2007) proposed heat exchangers that enable the oxygen to be heated in a satisfactory manner, the use of this hot oxygen also poses specific problems in the operation of furnaces, and in particular in glassmaking furnaces.

It is known that large glass melting furnaces, i.e. furnaces having production capacities of several hundreds of tonnes per day, are constructed to operate without interruption for periods of more than ten years. This service life is determined mainly by the wear of the refractory materials forming the walls thereof.

During these very long periods the other elements of the furnace, and in particular the burners, must maintain all their initial performance levels. There are two main reasons that are likely to change their characteristics. On the one hand, the circulation of hot gases, in particular oxygen, causes wear of the injection elements. On the other hand, the fuels subjected to very high temperatures in the conduits close to the combustion zone can cause deposits that inhibit the flow of these fuels. This latter effect is noticeable in particular in the use of heavy fuels when these are exposed to temperatures exceeding 180° C., for example. However, the breakdown of gaseous fuels can also occur to a lesser degree, even if this only occurs to a significant extent at temperatures exceeding the 600s° C.

The injection means for the fuels must be maintained regularly throughout the service life of the furnace, whatever fuels are selected.

Maintenance operations must be conducted without interrupting the operation of the furnace. One problem is to design burners and their associated supply means in such a manner that these operations can be conducted in relatively convenient and rapid conditions. The inventors endeavour to propose means and ways of implementing these, so that this question can be answered.

The inventors have firstly noted that transporting hot oxygen requires the use of specific means. The highly corrosive nature of hot oxygen means that its circulation must be limited to the shortest possible routes. It is also necessary to avoid the impact of the flow of oxygen in conduits having curves that are too severe. It is also desirable to avoid any surface irregularities on the route of this gas. In particular, joints are preferably formed by welding, with these welds having a polished surface.

These requirements, as well as others, in the management of hot oxygen mean that the means used are substantially fixed. These means are therefore not suitable for the maintenance operations discussed above.

BRIEF SUMMARY OF THE INVENTION

To take these problems into account, the inventors propose to configure burners so that the means for supplying the fuels can undergo these maintenance operations without it being necessary to encroach on those of the hot oxygen. In general, the mode of supplying power to the burners according to the invention includes, on the one hand, fuel supply means that are combined with a supply of essentially unheated oxygen, and on the other hand means for supplying hot oxygen that are independent on the former supply means.

DETAILED DESCRIPTION OF THE INVENTION

To retain the advantage of the energy balance inherent in the use of hot oxygen in the system, the fraction of unheated oxygen must remain as low as possible. In an arrangement where the fuel and the hot oxygen are introduced separately into the burner, in other words at separate points even if the distance between these remains small, it is necessary to provide a fraction of the oxygen to maintain and stabilise the flame at the level of injection of the fuel. In order to obtain this partial combustion, referred to as "primary" combustion, the proportion of oxygen in relation to the total amount necessary for complete combustion is very low. In all cases this fraction is lower than 10% of the total amount of oxygen consumed by the burner in question. Advantageously, this proportion lies in the range of between 1.5 and 7% of the total amount of oxygen necessary to assure complete combustion of the fuel.

It is understood that the benefit of using hot oxygen is not appreciably affected by this very restricted fraction of unheated oxygen.

Unheated should be understood to mean that the oxygen is present in essentially ambient temperature conditions which act on its course to move it towards the furnace. Its temperature necessarily rises as it passes the refractory walls of the furnace. What is important is that the conduits preceding this supply point are not subjected to the action of hot oxygen. The temperature of the oxygen is preferably ambient temperature and must not exceed a hundred degrees, wherein the temperature in the vicinity of the furnace is still appreciably higher than that of the atmosphere at a distance from the furnace.

The introduction of this fraction of unheated oxygen into the furnace must occur in the immediate vicinity of that of the fuel, or better this introduction must be simultaneous. To avoid a premature reaction in the conduits, the fuel and hot oxygen are still moved in separate conduits up to the ignition point, which is located close to the internal wall of the furnace. In a preferred arrangement, the end of the fuel injector is located slightly set back in the refractory wall so as not to bring this end to too high a temperature and to prevent deposits from forming as a result of the fuel cracking and/or prevent the end of the injectors from degrading.

As indicated above, the essential feature of the oxygen supply is that hot oxygen is used. The most resistant alloys known (presented in the application cited above) enable the oxygen to be brought to 550° C., or better to 600° C. and at the extreme to 650° C., without causing damage even over long periods. The temperatures of the oxygen used do not exceed these limits and can amount in particular to between 350° and 550° C.

The intake of this oxygen can occur close to the supply point of the fuel where the conduits remain separate to be able to encroach on the fuel conduits without touching those of the hot oxygen. Nevertheless, it is preferred according to the invention to arrange the supply points of this hot oxygen in such a manner as to benefit the development of a flame, in which the combustion occurs progressively over the course of this flame. This technique is known in principle. It is referred to as "staged combustion".

The aim of staged combustion is to limit the highest temperature reached in the flame by distributing the combustion over the length thereof by the progressive feed of oxygen. Such a progressive feed is achieved in particular by the introduction of the oxygen into the furnace being conducted at a distance from the injection of the fuel. In that way, after having progressed inside the furnace the gas flows meet at a distance from the wall, on which the burner is located.

To further benefit the progressive action of the flame, it is advantageous to introduce hot oxygen from several points at increasing distances from that of the injection of the fuel.

To take into consideration the expansion of the gas flow during its progression in the flame, said expansion taking into account the natural expansion of the emitted jet and the temperature elevation, the quantities of oxygen used are advantageously all the more significant as they enter this flow further downstream in the flame.

For practical reasons, there are necessarily a small number of intake points. They are advantageously arranged symmetrically in relation to the supply point of the fuel in such a way that the flame also develops symmetrically.

Advantageously, the number of hot oxygen intake points on either side of the supply point of the fuel does not exceed three and is preferably equal to two.

The proportions of oxygen introduced, as indicated, are advantageously more significant, the further away they are from the supply point of the fuel. Working from this circumstance, the ratio of the quantities introduced at two consecutive points, which will increase in distance from the supply point of the fuel, is preferably $Q_n/Q_{n+1} < 1$, and advantageously equal to $0.2 < Q_n/Q_{n+1} < 0.6$.

The quantities of hot oxygen are preferably controlled at the same burner without interposing elements such as valves, wherein the components are likely to be quickly corroded. The proportions distributed are preferably determined by regulating nozzles of appropriate dimensions arranged upstream of the supply point into the burner and downstream of the heat exchanger, in which the oxygen is heated.

It is understood that in operations for maintenance of the fuel injectors outlined above, as the single injector is stopped momentarily the operation of the entire burner is interrupted. The injection conduits of the fuel are removed from the burner for repair. The associated conduits for the cold oxygen are removed at the same time. This operation does not pose any problem in principle in that the pipes in question are connected to installations upstream by elements (connectors, joints . . . ), which because of the absence of excessive corrosion by the transported products, can be made from traditional materials using traditional structures. The disassembly of these elements is provided for from the outset to cater for these maintenance operations.

However, the arrangement of the burner having a single fuel injection requires that the operation of the burner will be interrupted. This interruption does not compromise the operation of the furnace if this has a large number of burners and the interrupted energy supply, which only represents a fraction of the total, can even possibly be compensated by the momentary increase in the activity of the adjacent burners. The energy distribution is thus displaced only slightly in the area of the furnace.

If, however, the intention is to further minimise this modification of the spatial distribution, it is possible to use burners that have more than one fuel injection point, in particular two points.

The operation of these burners proceeds overall according to the process described above with respect to the burners that only have a single supply point. In normal operation, the two injectors are thus advantageously operating simultaneously and preferably each competes for half the fuel supply. During maintenance operations one of the injectors can be interrupted in operation while the other remains in operation with its activity possibly being modified to compensate fully or partially for the interrupted fuel supply. Once the first injector is repaired, the process is repeated for the second. In these conditions the burner can deliver a power that has been modified little or not at all in relation to that corresponding to normal operation.

In the previous proposal, the fuel supply points are intended for the same fuel. However, it is possible to provide two or more fuel supplies on the same burner for different types of fuels, in particular gaseous fuels, on the one hand, and liquid fuels such as heavy gas oils, on the other.

The amount of interest in burners that are able to operate with different types of fuels is firstly associated with the quality of these fuels. The use of natural gas, for example, is known to lead to an increased water content in the atmosphere of the furnace in relation to that obtained, for example, with heavy gas oil. In the case of glass melting furnaces, the nature of this atmosphere is an element that has a direct influence on the refining process and on the water content of the glass produced. Therefore, the choice of fuel is a significant element of the whole.

In any case, when using liquid fuels such as heavy gas oils the conditions of atomisation of these fuels must be taken into consideration. While, in principle, the atomisation of the liquid can be achieved by purely mechanical means, the most usual procedure is by means of a propellant gas (air, water vapour, natural gas, oxygen . . . ). The volume of the latter does not compare with that of the primary oxygen and in principle is of little importance in combustion mechanisms. However, this gas is not entirely inconsequential. In particular, if compressed air is commonly used, the atmosphere of the flame will be enriched in nitrogen and the risk of NOx formation is thus increased. The use of water vapour does not pose this disadvantage, but the thermal capacity of the water is high, which slightly increases the power consumption.

Economic considerations also intervene in the choice of fuel. On the one hand, the respective prices, in particular of gas and heavy fuel oil, are subject to substantial variation over time. However, above all the cost of supplying gas is partly dependent on the terms negotiated with the suppliers. These allow advantageous rates when supply is accompanied by suspensive conditions to take into consideration in particular significant variations in demand. According to these conditions, the supply can be interrupted momentarily. Therefore, to benefit from these terms without interrupting production, it is necessary to be able to transfer from one fuel to another practically instantaneously. For this, it is necessary to have burners that are capable of working with these different fuels.

The invention also proposes burners corresponding to the arrangements outlined above as well as means associated with these burners, which will be discussed in the following description relating to the attached figures with additional details regarding their use.

BRIEF DESCRIPTION OF THE DRAWINGS

FIG. 1b is a front view of the burner of FIG. 1a;

FIG. 2b is a front view of the burner of FIG. 2a;

FIG. 4 is similar to the previous figure and relates to the burner of FIG. 2a;

Figure 1A:
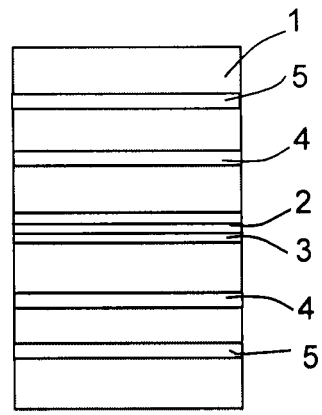
FIG. 1a is a schematic sectional view of a burner used according to the invention.

The burner of FIG. 1a comprises a refractory block 1 which forms part of the wall of the furnace. This block is advantageously formed from several parts assembled together by a reinforcement (not shown) located on the outer side in relation to the furnace. The refractory block has several conduits passing through it which open onto the inside face of the furnace and allow the supply of fuel and oxygen.

The arrangement of the various supply conduits is dependent on the combustion operation required and also on the general form of the flame.

In the case of furnaces operating by means of oxy-combustion, a substantial advantage lies in the absence of nitrogen, which at very high temperature leads to the formation of NOx oxides. Nevertheless, large industrial furnaces cannot be perfectly sealed against the outside atmosphere. Some air, and thus nitrogen, will still enter, even if one endeavours to maintain a certain tightness, in particular by dynamic means.

The presence of even residual nitrogen can lead to the presence of NOx in reduced quantity. Since the proportions of these pollutants must be as low as possible, it is advantageous to control the operation of the furnace working with oxy-combustion in order to further minimise formation thereof.

It is known that the formation of nitrogen oxides is promoted by the highest temperatures reached in the flames. Therefore, the use of burners according to the invention aims to limit the higher temperatures present locally in the flames with the same developed power.

A technique for limiting the temperatures lies in ensuring that the fuel is progressively brought into contact with the oxygen carrier. The procedure is usually referred to as "staged combustion".

To achieve the staged combustion procedure, a low proportion of oxygen is introduced together with the fuel so that the flame is stabilised at the injection point. However, the quantity of oxygen must remain low so as not to concentrate too significant a portion of the combustion energy with low volume and increase the temperature of the flame.

Beyond the injection point the flame is successively supplied with oxygen by the mixture of this primary flame with the jets of oxygen emitted from the injection nozzles located on the wall at some distance from the fuel injection nozzle and the primary oxygen injection nozzle. These secondary supplies are arranged as a function of the characteristics of the gas flows (flow rate, emission rate, temperature), the expansion thereof and the length of flame required.

Figure 1B:
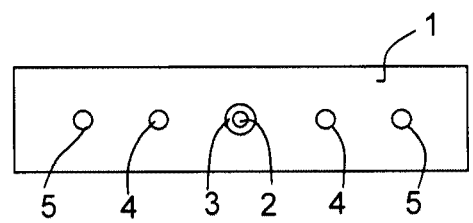

In the illustration in FIGS. 1a and 1b, the fuel supply is shown schematically by conduit 2. This conduit is concentric to conduit 3 that conveys the primary oxygen. The whole assembly is arranged in the centre of the burner.

On either side of the primary supply means, two "secondary" 4 and "tertiary" 5 supply means complete the oxygen supply necessary to assure complete combustion of the fuel injected at 2.

The usage of this type of burner can advantageously follow the directions outlined in publications WO 02/081967A and WO 2004/094902A, both with respect to the spatial distribution of the injections and with respect to the respective quantities of fuel and oxygen used.

The distribution of oxygen over the conduits is advantageously such that the quantity increases with the distance separating its injection point from that of the fuel. In the configuration shown in FIGS. 1a and 1b, the supplies through conduits 4 are advantageously less significant than those conducted from conduits 5.

As an indication, the ratio of the respective supply for conduits 4 ($Q_1$) and 5 ($Q_2$) lies in the range of between 0.2 and 0.6, for example.

To obtain a flame with an overall shape that is substantially plane, the axes of the different conduits are advantageously arranged in the same plane. A plane flame is advantageous in the case of glass melting furnaces. It allows the largest possible surface of the bath to be directly exposed to the radiation emitted by the flame or indirectly to that of the refractory materials exposed to this flame, in particular those of the crown of the furnace.

The arrangement of the injection points can be substantially different when the shape of the flame is not controlled by a heat exchange with a plane surface. In particular, the supplies can be arranged concentrically around the primary injection point.

Figure 2A:
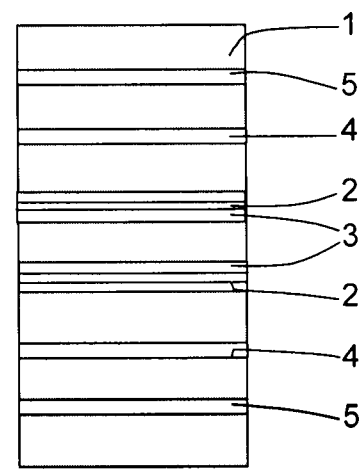
FIG. 2a is a view similar to that of FIG. 1a, wherein the burner comprises two fuel supply means.
Figure 2B:
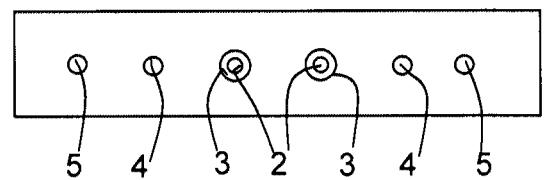

The burners shown schematically in FIGS. 2a and 2b have the previous general structure. They differ from this through the presence of two supplies for fuel 2 and primary oxygen 3.

The provision of two injection points, which can be as close to one another as space conditions allow, is intended to make maintenance operations easier. The closer the injection points are, the closer the mode of operation resembles that in which a single primary supply is arranged.

Whatever precautions are taken, the operation of the burners can lead to a fouling by the decomposition products of the fuels. To minimise this risk, the ends of the nozzles are advantageously set back slightly in relation to the inside wall of the furnace. The reason for the set back arrangement is also to provide protection for the end of the injection pipe. By proceeding in this manner, the temperature is essentially lower than that prevailing in the furnace, in particular because of the circulation of the fuel itself and that of the "cold" oxygen. It is to be noted that even if the fuel is preheated to increase the energy efficiency, the temperatures reached are limited to avoid the risk of thermal decomposition in the supply conduits.

Maintenance operations must be conducted on the furnace without interrupting operation. It is necessary to assure that these operations hardly change the operating process. The stoppage of a burner in large glass melting furnaces, which usually comprise between 6 and 12 of these, can be momentarily compensated by a corresponding increase in the activity of the adjacent burners. This still results in a change in the general equilibrium of the fire curve and possibly also in the circulation of fumes which are used further along in the heating cycle of the oxygen, as indicated.

An alternative solution for minimising the influences of maintenance operations lies in the use of burners having two fuel injections, for example. Advantageously, the two injections are then used simultaneously. When a maintenance operation needs to be conducted, the operation of one of these injection means is momentarily interrupted. The second injection means possibly takes over a part of or all the supply corresponding to that of the injector out of operation.

This way of proceeding maintains the spatial distribution of the energy in the furnace in an almost identical manner. When the first injector is replaced, the second can undergo maintenance in turn.

In these maintenance operations, the most usual procedure is to remove the fuel injection lance from the refractory block, through which it penetrates into the furnace. The freed opening is momentarily blocked to prevent the penetration of air.

The fuel supplies do not generally require conduits that have any special corrosion-resistant characteristics. Usual materials such as traditional stainless steels are sufficient and, above all, these conduits can bear connectors, valves and other elements that are able to be disassembled during these maintenance operations.

The removal of these conduits does not cause significant problems. The question no longer arises when the primary oxygen is injected with the fuel at a relatively low temperature, e.g. a temperature not exceeding 100° C.

In order to bring the energy efficiency of the burners to the highest level, it is advantageous to use the oxygen that is preheated to temperatures that can reach or exceed 550° C. In these conditions the oxygen conduits must have very particular resistance qualities and welds or connection elements must be avoided or reduced as far as possible. For this reason, the supply conduits for the hot oxygen all remain in place during maintenance operations.

Figure 3:
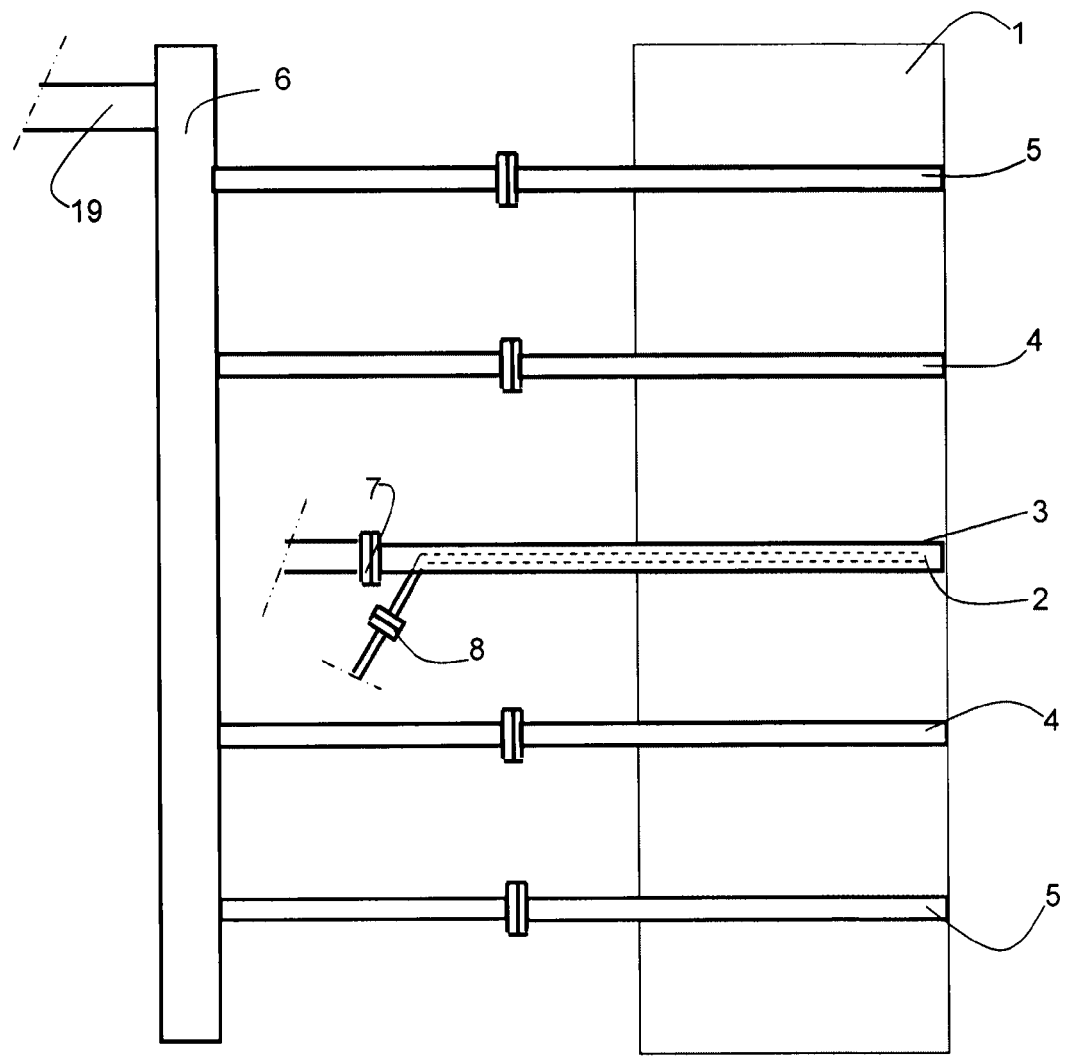
FIG. 3 is a view of the burner of Figure is partially showing the supply means of the burner.
Figure 4:
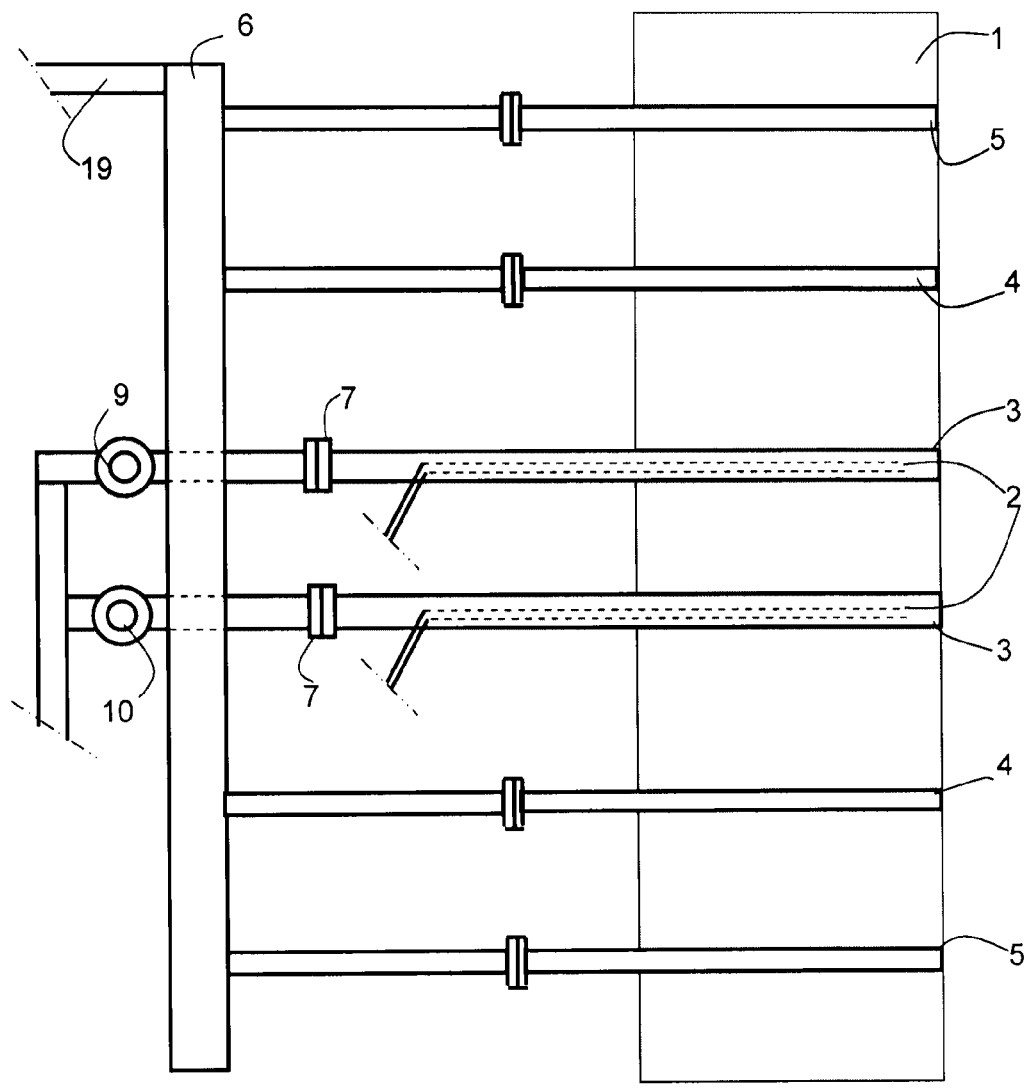

FIGS. 3 and 4 show the elements of the burners of FIGS. 1 and 2 integrating into them additional elements for the supply of hot oxygen.

Conduits 4 and 5 are connected to a supply tank 6 to supply hot oxygen. The provision of a valve between the supply tank 6 and the burner is avoided. The distance between the supply tank and the burner is as short as the space in the vicinity of the furnace will allow.

The straight conduits shown can have curves. It is preferred that the severity of these curves is as low as possible to minimise the impact of the hot oxygen on their walls, which is likely to cause erosion thereof eventually.

The quantity of oxygen distributed over each conduit is continuously determined by the dimensions of regulating nozzles located either in the conduits or at the junction of conduits 4 and 5 with the supply tank 6.

The supply tank is itself supplied by a conduit 19 connected to a heat exchanger (not shown in these figures), in which the oxygen is heated. Since there is no ability to interpose valves over the course of the hot oxygen, the changes in operation are controlled from the cold oxygen fed into the exchanger. These changes are necessarily limited.

The supplies for fuel and cold oxygen shown in FIGS. 3 and 4 are formed by conduit 3. This conduit 3 envelopes the fuel conduit 2. The respective supply circuit of these two conduits can be separated at the level of the clips 7 and 8. Once these clips are undone, conduits 2 and 3 can be removed from the refractory material to carry out their repair.

FIGS. 2 and 3 schematically show the possible layout in the case where the fuel passing through the central conduit 2 is in gas form. When the fuel is in liquid form, its introduction requires the use of means that allow this liquid to be atomised. In particular when the atomisation is achieved by means of a gas (vapour, air . . . ), the fuel feed conduit must still comprise a feed conduit for this atomisation gas to close to the injection point.

As shown in FIG. 4, the supply of "cold" oxygen through conduits 3 can be regulated separately by means of valves 9 and 10, for example.

As proposed in the unpublished European Patent Application No. 08 102 880, filed on Mar. 25, 2008, still with respect to minimising difficulties associated with the transport of hot oxygen, the thermal exchanger in which the oxygen is heated is preferably disposed as close to the burner as possible. For the same reasons, the number of burners supplied from one exchanger is limited. Preferably, each exchanger does not supply more than two burners, and it is particularly preferred if each exchanger is only connected to one burner. In this way, the oxygen flow rate for each burner can be controlled independently of the other burners and the oxygen can be controlled before it passes into the heat exchanger.

Figure 5:
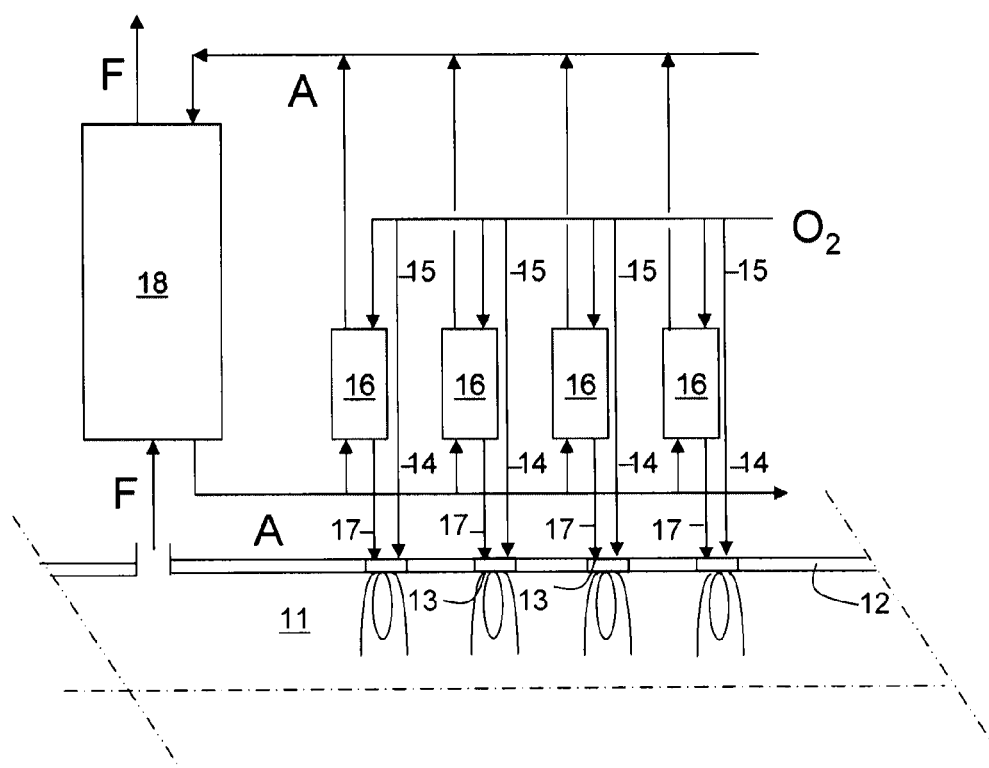
FIG. 5 schematically shows a type of supply circuit for hot oxygen on one side of a furnace fitted with burners.

FIG. 5 schematically shows an oxygen supply assembly of a furnace intended, for example, for melting glass materials.

The furnace 11 is shown in partial plan view. Its side refractory wall 12 bears a series of schematically shown burners 13 inserted into the wall. Each burner 13 is supplied with oxygen in two ways. A first series of conduits 14 conveys the cold oxygen to feed the primary combustion, as described above. A second series of conduits 15 supplies the heat exchangers 16. At the outlet of these heat exchangers the hot oxygen is transported up to the burners through conduits 17 that represent overall the different supplies of hot oxygen of each burner.

In the diagram in FIG. 5, the heat exchangers 16 cause a preheated fluid coolant to flow in counterflow to the oxygen. In the shown embodiment, the heating of this fluid coolant is conducted in a recuperator 18, in which the fumes F exiting from the furnace 11 flow.

While it is possible in principle to conduct a heat exchange directly between the fumes and the products to be preheated, the endeavour to operate in the best conditions with respect to efficiency and safety results in more complex exchange assemblies and in particular through the use of the intermediate fluid coolant.

In a first "recuperator" 18 the fumes reheat the intermediate fluid, e.g. air, nitrogen, $CO_2$, or any appropriate fluid that circulates, for example, in a loop between this recuperator and the exchangers 16, in which the oxygen is reheated. An alternative to the intermediate fluid such as air is to not use the loop and recover the hot air at the outlet of the secondary exchangers through a boiler or other means of energy recovery.

The invention claimed is:

1. A power supply to burners of at least one glass melting furnace operating by oxy-combustion, the power supply comprising:
    at least one fuel injection unit;
    at least one supply unit that supplies a first oxygen fraction of hot oxygen at a temperature of 350° C. to 650° C.; and
    at least one supply unit that supplies a second oxygen fraction to the fuel injection unit,
    wherein
    distribution of the first and second oxygen fractions is carried out in order to develop a staged combustion,
    the second oxygen fraction is injected concurrently with a fuel, and
    the second oxygen fraction is introduced essentially without being heated prior to its supply into the fuel injection unit.

2. The power supply according to claim 1, in which the second oxygen fraction represents at most 10% of a total of the first and second oxygen fractions.

3. The power supply according to claim 1, in which the second oxygen fraction represents from 1.5 to 7% of a total of the first and second oxygen fractions.

4. The power supply according to claim 1, wherein the at least one supply unit for hot oxygen is at least two supply units, which are located at a distance from the fuel injection unit and symmetrically in relation to the at least one fuel injection unit.

5. The power supply according to claim 4, comprising at least two series of hot oxygen supply units on either side of the fuel injection unit.

6. The power supply according to claim 5, wherein the proportion of hot oxygen supplied increases as supplying is performed at a point more remote from the fuel injection unit.

7. The power supply according to claim 5, comprising two series of supply units on either side of the fuel injection unit, wherein the distances between the fuel injection unit and a closest supply point for hot oxygen are essentially of the same order as a distance separating a first and a second supply point located on the same side of a fuel injection units.

8. The power supply according to claim 7, wherein the closest supply point for hot oxygen to the fuel injection unit is at most equal to the supply point that is not as close.

9. The power supply according to claim 8, wherein the closest supply point to the fuel injection unit is in a range of between 20 and 40% of that of the supply point that is a furthest distance away.

10. The power supply according to claim 1 comprising at least two identical fuel injection units, the operation of which can be modulated for each of the at least two identical fuel injection units, such that each can operate alone or simultaneously with the other injector.

11. The power supply according to claim 10, comprising two fuel injection units, each of which is independent and can be momentarily interrupted in operation for maintenance.

12. The power supply according to claim 9, comprising at least two different fuel injectors, each being dedicated to a given fuel.

13. The power supply according to claim 12, comprising at least one injector which supplies a gas and at least one injector which supplies at least one liquid fuel.

14. The power supply according to claim 13 that allows a choice of fuel employed.

* * * * *